United States Patent
Terada et al.

(10) Patent No.: US 10,284,572 B2
(45) Date of Patent: May 7, 2019

(54) MANAGEMENT METHOD, MANAGEMENT DEVICE, AND MANAGEMENT PROGRAM

(71) Applicant: FUJITSU LIMITED, Kawasaki-shi, Kanagawa (JP)

(72) Inventors: Takeaki Terada, Kawasaki (JP); Yoshinori Katayama, Kawasaki (JP); Masanobu Morinaga, Yokohama (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/631,359

(22) Filed: Feb. 25, 2015

(65) Prior Publication Data
US 2015/0264075 A1   Sep. 17, 2015

(30) Foreign Application Priority Data
Mar. 14, 2014   (JP) .................................. 2014-052693

(51) Int. Cl.
*H04L 29/08* (2006.01)
*H04L 29/06* (2006.01)

(52) U.S. Cl.
CPC .......... *H04L 63/1408* (2013.01); *H04L 63/20* (2013.01)

(58) Field of Classification Search
CPC .. H04L 63/102; H04L 63/1441; G06F 21/604
(Continued)

(56) References Cited

U.S. PATENT DOCUMENTS 7,607,164 B2 * 10/2009 Vasishth ............... G06F 21/577
                                                 709/223
8,214,398 B1 *  7/2012 Cowan ................ G06F 21/6218
                                                 707/785
(Continued)

FOREIGN PATENT DOCUMENTS

EP        1 083 508        3/2001
JP       2001-134706       5/2001
(Continued)

OTHER PUBLICATIONS

Office Action issued by the Patent Office of Japan dated Aug. 15, 2017 in corresponding Japanese patent application No. 2014-052693.

*Primary Examiner* — Lynn D Feild
*Assistant Examiner* — Viral S Lakhia
(74) *Attorney, Agent, or Firm* — Staas & Halsey LLP

(57) ABSTRACT

A management method comprising, extracting, using a processor, psychological characteristics that are characteristic of people who have experienced a certain incident; extracting, using the processor, behavioral characteristics that are characteristic of people who have experienced a certain incident; obtaining, using the processor, a relational expression between each item of the extracted psychological characteristics and a plurality of items of the extracted behavioral characteristics; and calculating, using the processor, a psychological characteristic value from the relational expression of each psychological characteristic item and a value of log data for each user and, distributing, using the processor, to any user whose psychological characteristic value exceeds a predetermined value, a measure devised for the exceeded psychological characteristic.

4 Claims, 12 Drawing Sheets

(58) Field of Classification Search
USPC ............. 726/25, 23; 705/7.29, 500; 434/236
See application file for complete search history.

(56) References Cited

U.S. PATENT DOCUMENTS

| | | | | |
|---|---|---|---|---|
| 8,326,987 | B2* | 12/2012 | Lin | G06F 21/554 709/225 |
| 8,359,278 | B2* | 1/2013 | Domenikos | G06Q 30/0185 705/1.1 |
| 9,336,302 | B1* | 5/2016 | Swamy | G06F 17/3071 |
| 9,746,985 | B1* | 8/2017 | Humayun | G06Q 10/10 |
| 2002/0116247 | A1* | 8/2002 | Tucker | G06Q 30/06 709/224 |
| 2003/0212546 | A1* | 11/2003 | Shaw | G06F 17/279 704/9 |
| 2004/0210159 | A1* | 10/2004 | Kibar | A61B 5/4803 600/558 |
| 2005/0171955 | A1* | 8/2005 | Hull | G06Q 50/01 |
| 2005/0183143 | A1* | 8/2005 | Anderholm | G06F 11/32 726/22 |
| 2006/0224408 | A1* | 10/2006 | Veley | G06Q 30/02 705/500 |
| 2008/0015927 | A1* | 1/2008 | Ramirez | G06Q 10/06395 705/7.29 |
| 2008/0111670 | A1* | 5/2008 | Wilbrink | G08G 1/161 340/438 |
| 2008/0147567 | A1* | 6/2008 | Perry | G06Q 10/10 705/36 R |
| 2009/0293121 | A1* | 11/2009 | Bigus | G06F 21/316 726/22 |
| 2010/0121916 | A1* | 5/2010 | Lin | G06F 21/554 709/203 |
| 2010/0179930 | A1* | 7/2010 | Teller | G06N 99/005 706/12 |
| 2011/0004580 | A1* | 1/2011 | Varghese | G06N 99/005 706/47 |
| 2011/0072499 | A1* | 3/2011 | Lin | G06F 21/35 726/6 |
| 2012/0284080 | A1* | 11/2012 | De Oliveira | G06Q 10/04 705/7.29 |
| 2013/0073387 | A1* | 3/2013 | Heath | G06Q 30/02 705/14.53 |
| 2013/0091539 | A1* | 4/2013 | Khurana | G06F 21/552 726/1 |
| 2013/0227700 | A1* | 8/2013 | Dhillon | G06Q 50/01 726/26 |
| 2013/0340089 | A1* | 12/2013 | Steinberg | H04L 63/10 726/27 |
| 2014/0244762 | A1* | 8/2014 | Wyndowe | H04L 67/10 709/205 |
| 2015/0012147 | A1* | 1/2015 | Haghighat-Kashani | G06Q 30/02 700/291 |
| 2015/0205958 | A1* | 7/2015 | Turgeman | G06F 21/554 726/23 |

FOREIGN PATENT DOCUMENTS

| | | |
|---|---|---|
| JP | 2012-94056 | 5/2012 |
| JP | 2013-20587 | 1/2013 |

* cited by examiner

FIG.4

| | USER ID | | | |
|---|---|---|---|---|
| | u0001 | u0002 | u0003 | ... |
| Q1 (HAVE OPENED DRILL EMAIL) | 1 (YES) | 0 (NO) | 0 (NO) | |
| Q2 (HAVE GOTTEN INFECTED WITH VIRUS) | 0 (YES) | 0 (NO) | 1 (NO) | |
| Q3 (DEGREE OF OVERCONFIDENCE ON SCALE OF 1-5) | 5 | 3 | 4 | |
| Q4 (DEGREE BY WHICH TO GIVE PRIORITY TO IMMEDIATE PROFIT ON SCALE OF 1-7) | 7 | 4 | 2 | |
| Q5 (POSSIBILITY OF FALLING VICTIM IN FUTURE (IN %)) | 20 | 50 | 50 | |
| ⋮ | | | | ⋮ |
| AWARENESS GROUP | LOW-AWARENESS GROUP | HIGH-AWARENESS GROUP | LOW-AWARENESS GROUP | ... |

FIG.5

| | | LOW-AWARENESS GROUP g1 | HIGH-AWARENESS GROUP g2 | t VALUE | JUDGMENT CRITERION VALUE | JUDGMENT |
|---|---|---|---|---|---|---|
| Q3 (DEGREE OF OVER-CONFIDENCE) | NUMBER OF PEOPLE n | 30 | 270 | 2.74 | 2.04 | T |
| | MEAN m | 3.5 | 3.0 | | | |
| | STANDARD DEVIATION $\sigma$ | 1.0 | 2.0 | | | |
| Q4 (DEGREE BY WHICH TO GIVE PRIORITY TO IMMEDIATE PROFIT) | NUMBER OF PEOPLE n | 30 | 270 | 2.35 | 2.04 | T |
| | MEAN m | 4.3 | 4.0 | | | |
| | STANDARD DEVIATION $\sigma$ | 0.7 | 2.0 | | | |
| Q5 (ESTIMATED POSSIBILITY OF FALLING VICTIM) | NUMBER OF PEOPLE n | 30 | 270 | -1.36 | 2.04 | F |
| | MEAN m | 45.0 | 50.0 | | | |
| | STANDARD DEVIATION $\sigma$ | 20.0 | 21.0 | | | |

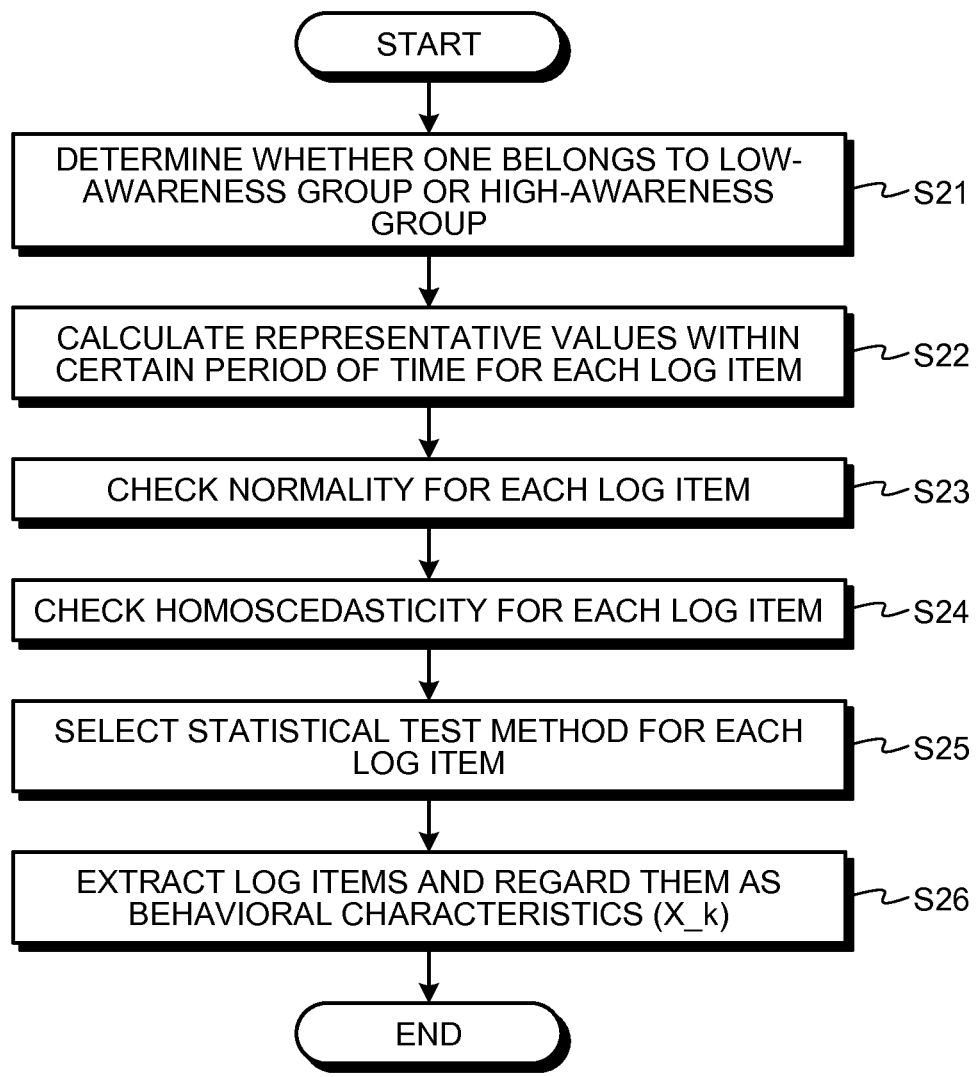

FIG.7

| | | USER ID | | | |
|---|---|---|---|---|---|
| | | u0001 | u0002 | u0003 | ... |
| AWARENESS GROUP | | LOW-AWARENESS GROUP | HIGH-AWARENESS GROUP | LOW-AWARENESS GROUP | |
| WARNING SCREEN DISPLAY TIME | MEASUREMENT COUNT c | 5 | 3 | 4 | |
| | MEAN m | 2.1 SEC | 4.1 SEC | 2.5 SEC | |
| | STANDARD DEVIATION σ | 5.2 SEC | 6.3 SEC | 5.0 SEC | |
| NUMBER OF EMAILS SENT PER DAY | MEASUREMENT COUNT c | 20 | 19 | 20 | |
| | MEAN m | 3.1 EMAILS | 2.2 EMAILS | 2.0 EMAILS | |
| | STANDARD DEVIATION σ | 4.2 EMAILS | 5.1 EMAILS | 5.0 EMAILS | |
| PATCH APPLICATION INTERVAL | MEASUREMENT COUNT c | 4 | 4 | 4 | |
| | MEAN m | 14.1 DAYS | 13.3 DAYS | 15.0 DAYS | |
| | STANDARD DEVIATION σ | 2.2 DAYS | 3.2 DAYS | 3.0 DAYS | |
| ... | ... | ... | ... | ... | ... |

FIG.8

| | | LOW-AWARENESS GROUP g1 | HIGH-AWARENESS GROUP g2 | t VALUE | JUDGMENT CRITERION VALUE | JUDGMENT |
|---|---|---|---|---|---|---|
| WARNING SCREEN DISPLAY TIME | NUMBER OF PEOPLE n | 30 | 270 | -2.19 | 2.05 | T |
| | MEAN m | 2.0 SEC | 4.0 SEC | | | |
| | STANDARD DEVIATION σ | 5.0 SEC | 6.0 SEC | | | |
| NUMBER OF EMAILS SENT PER DAY | NUMBER OF PEOPLE n | 35 | 280 | 1.31 | 2.03 | F |
| | MEAN m | 3.0 EMAILS | 2.0 EMAILS | | | |
| | STANDARD DEVIATION σ | 4.5 EMAILS | 5.0 EMAILS | | | |
| PATCH APPLICATION INTERVAL | NUMBER OF PEOPLE n | 33 | 275 | 2.30 | 2.04 | T |
| | MEAN m | 14.0 DAYS | 13.0 DAYS | | | |
| | STANDARD DEVIATION σ | 2.5 DAYS | 3.0 DAYS | | | |
| ... | ... | ... | ... | ... | ... | ... |

FIG.9

```
START
  ↓
CHECK NORMALITY FOR PSYCHOLOGICAL
CHARACTERISTIC AND BEHAVIORAL      ~S31
CHARACTERISTIC
  ↓
S32
NORMALITY NOT SATISFIED? --YES--→
  ↓ NO                            |
PERFORM VARIABLE CONVERSION TO BRING ~S33
DATA CLOSER TO NORMAL DISTRIBUTION   |
  ↓←-------------------------------
CALCULATE RELATIONAL EXPRESSION BETWEEN
EACH PSYCHOLOGICAL CHARACTERISTIC AND  ~S34
BEHAVIORAL CHARACTERISTICS (X_k, k=1, 2, ...)
  ↓
END
```

FIG.10

| PSYCHOLOGICAL CHARACTERISTIC ($Y_i$) | FIRST COMPONENT | | SECOND COMPONENT | | ... |
|---|---|---|---|---|---|
| | BEHAVIORAL CHARACTERISTIC ($X_1$) | REGRESSION COEFFICIENT ($a_1$) | BEHAVIORAL CHARACTERISTIC ($X_2$) | REGRESSION COEFFICIENT ($a_2$) | |
| DEGREE OF OVERCONFIDENCE ($Y_1$) | WARNING SCREEN DISPLAY TIME | -3.1 | PATCH APPLICATION INTERVAL | 2.2 | |
| DEGREE BY WHICH TO GIVE PRIORITY TO IMMEDIATE PROFIT ($Y_2$) | WARNING SCREEN DISPLAY TIME | -2.3 | PATCH APPLICATION INTERVAL | 1.4 | |
| ... | ... | ... | ... | ... | ... |

| USER ID | PSYCHOLOGICAL CHARACTERISTIC | | | | JUDG-MENT |
|---|---|---|---|---|---|
| | Y_1 (DEGREE OF OVERCONFIDENCE ON SCALE OF 1-5) | Y_2 (DEGREE BY WHICH TO GIVE PRIORITY TO IMMEDIATE PROFIT ON SCALE OF 1-7) | Y_3 (DEGREE BY WHICH INFORMATION IS SHARED ON SCALE OF 1-6) | ... | |
| u0001 | 4.8 | 3.1 | 3.2 | ... | Y_1 |
| u0002 | 2.5 | 6.6 | 5.9 | ... | Y_2, Y_3 |
| u0003 | 2.5 | 3.3 | 2.9 | ... | NONE |
| ... | ... | ... | ... | ... | ... |

MANAGEMENT METHOD, MANAGEMENT DEVICE, AND MANAGEMENT PROGRAM

CROSS-REFERENCE TO RELATED APPLICATION

This application is based upon and claims the benefit of priority of the prior Japanese Patent Application No. 2014-052693, filed on Mar. 14, 2014, the entire contents of which are incorporated herein by reference.

FIELD

The embodiments discussed herein are related to a management method, a management device, and a management program.

BACKGROUND

With conventional business or commercial systems for providing various services to users, the security of the systems is improved by issuing a warning about security on the basis of the log, which is the user's past behavior data, so that users will not become victims of cracking. One example of cracking is caused by a standard-type attack email. With cracking by means of a standard-type attack email, he/she prompts a user to launch a program (executable file) attached to an electronic mail so as to use the launched program as a platform for, for example, invading the system. Thus, a warning is issued to, for example, a user who has executed a program attached to an electronic mail on the basis of the user's log so that the user will not inadvertently launch a program attached to an electronic mail.

Patent Literature 1: Japanese Laid-open Patent Publication No. 2001-134706, Patent Literature 2: Japanese Laid-open Patent Publication No. 2013-20587, and Patent Literature 3: Japanese Laid-open Patent Publication No. 2012-94056 are introduced as the Prior Art Document.

However, the conventional techniques described above merely issue a warning about security on the basis of the superficial user behavior based on a log, and fail to take into consideration psychological traits of the user. For example, it is not possible to issue a warning to those users having lower levels of security awareness, for example, users whose level of cautiousness for cracking has lowered.

SUMMARY

According to an aspect of an embodiment, a management method comprises, extracting, using a processor, psychological characteristics that are characteristic of people who have experienced a certain incident; extracting, using the processor, behavioral characteristics that are characteristic of people who have experienced a certain incident; obtaining, using the processor, a relational expression between each item of the extracted psychological characteristics and a plurality of items of the extracted behavioral characteristics; and calculating, using the processor, a psychological characteristic value from the relational expression of each psychological characteristic item and a value of log data for each user and, distributing, using the processor, to any user whose psychological characteristic value exceeds a predetermined value, a measure devised for the exceeded psychological characteristic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a psychological state data table;

FIG. 5 is a diagram illustrating an example of a psychological characteristic data table;

FIG. 6 is a flow chart illustrating a behavioral characteristic extraction step;

FIG. 7 is a diagram illustrating an example of a behavioral log data table;

FIG. 8 is a diagram illustrating an example of a behavioral characteristic data table;

FIG. 9 is a flow chart illustrating a calculation step;

FIG. 10 is a diagram illustrating an example of relational expression data;

DESCRIPTION OF EMBODIMENTS

Figure 1:
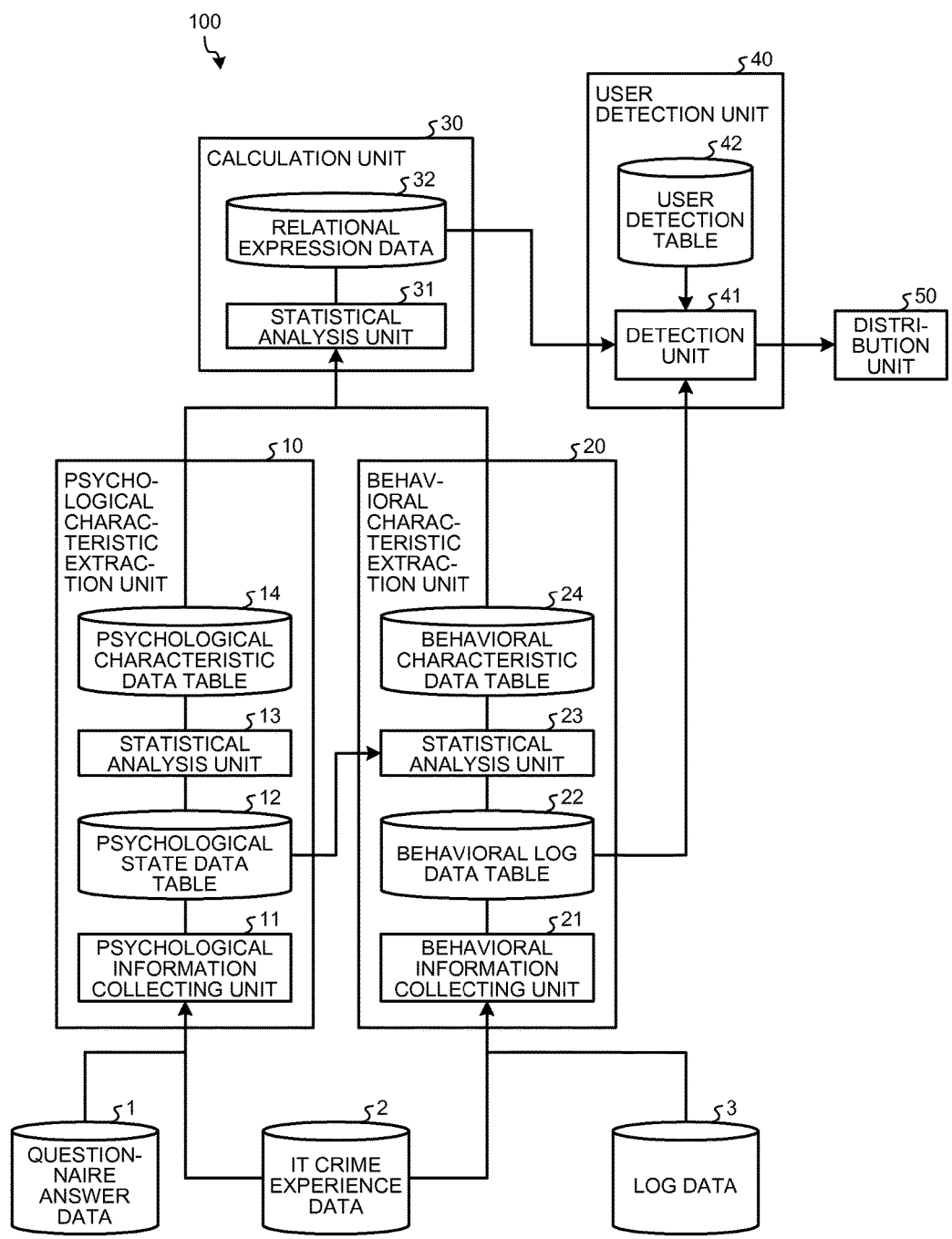
FIG. 1 is a block diagram illustrating a functional configuration of a management device according to an embodiment.

Preferred embodiments of the present invention will be explained with reference to accompanying drawings. Elements with like functions are denoted by like reference numerals throughout the embodiments, and redundant descriptions will be omitted. Note that the management method, the management device, and the management program to be described in the embodiments below are merely illustrative and do not limit the embodiments. Moreover, the embodiments below can be combined with one another as long as it will not be contradictory.

Figure 2:
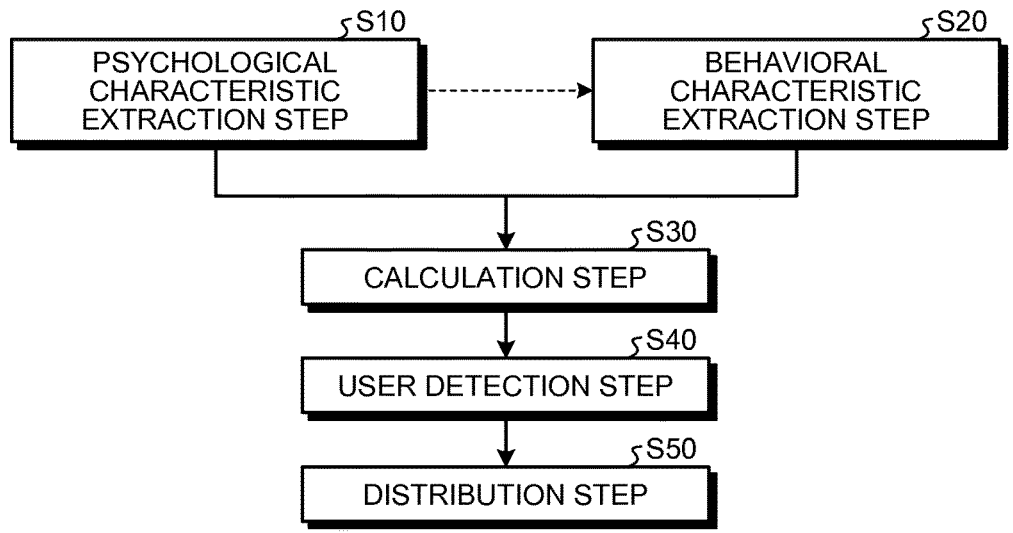
FIG. 2 is a flow chart illustrating process steps of a management device according to an embodiment.

FIG. 1 is a block diagram illustrating a functional configuration of a management device 100 according to an embodiment. FIG. 2 is a flow chart illustrating process steps of the management device 100 according to an embodiment. As illustrated in FIG. 1, the management device 100 includes a psychological characteristic extraction unit 10, a behavioral characteristic extraction unit 20, a calculation unit 30, a user detection unit 40, and a distribution unit 50. The management device 100 may be an information processing device such as a PC (Personal Computer) or a workstation. The management device 100 implements the functional configuration described above as the CPU (Central Processing Unit) executes programs (the details of the hardware configuration will be described later).

The psychological characteristic extraction unit 10 performs a process of extracting psychological characteristics that are characteristic of IT (Internet) crime victims. Specifically, in the psychological characteristic extraction step (step S10) illustrated in FIG. 2, the psychological characteristic extraction unit 10 refers to questionnaire answer data 1 and IT crime experience data 2, which are information about users to be samples, to extract psychological characteristics that are characteristic of IT crime victims. Note that users to be samples may be extracted arbitrarily by the system administrator or randomly from among users in the system. For example, the subjects may be all the users in the system or some of the users.

IT crime victims, as used herein, may generally refer to those who have lower levels of security awareness for the damage by cracking, or the like, via a network such as the Internet. For example, IT crime victims are not limited to those who have become victims (who have had actual damages) of cracking, or the like. IT crime victims may include those who have undergone a certain incident that is attributable to lower levels of security awareness, for example, those who have opened a program attached to a drill email in a standard-type attack email drill.

The questionnaire answer data 1 is data storing answers to a questionnaire including question items regarding the psychological state from users to be samples. The questionnaire for users to be samples includes question items asking if they have opened a drill email (executed a program) in a standard-type attack email drill, those asking if they have gotten infected with a virus, those for evaluating the degree of overconfidence, those for evaluating the degree by which they give priority to an immediate profit, and those testing the possibility they might become cracking victims. For the question items regarding the psychological state, such as those for evaluating the degree of overconfidence and those for evaluating the degree by which they give priority to an immediate profit, each user's answer may be converted into numbers (evaluated in grades). The questionnaire may include not only question items regarding the psychological state, but also question items for determining whether they are those with lower levels of security awareness, such as those asking if they have opened a drill email and if they have gotten infected with a virus. The questionnaire answer data 1 describes answers to the questionnaire for each of user IDs identifying users to be samples.

The IT crime experience data 2 is data storing whether or not each user to be a sample has become an IT crime victim (has had cracking damage). Specifically, the IT crime experience data 2 describes whether or not one has become an IT crime victim for each of user IDs identifying users to be samples.

Figure 3:
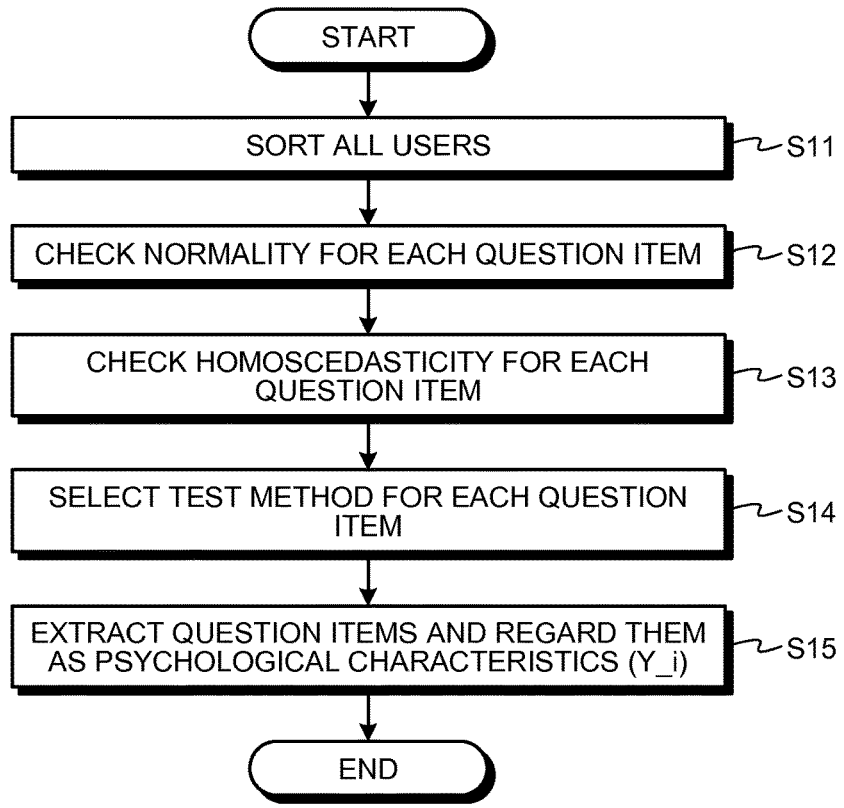
FIG. 3 is a flow chart illustrating a psychological characteristic extraction step.

The psychological characteristic extraction unit 10 includes a psychological information collecting unit 11 and a statistical analysis unit 13, as components that refers to the questionnaire answer data 1 and the IT crime experience data 2 described above to extract psychological characteristics that are characteristic of IT crime victims. Now, the details of processes of the psychological information collecting unit 11 and the statistical analysis unit 13 in the psychological characteristic extraction step will be described. FIG. 3 is a flow chart illustrating the psychological characteristic extraction step.

As illustrated in FIG. 3, the psychological information collecting unit 11 refers to the questionnaire answer data 1 and the IT crime experience data 2 to sort all users to be samples into a low-awareness group of users with lower levels of security awareness and a high-awareness group of users with higher levels of security awareness (step S11). Specifically, for each user ID, the psychological information collecting unit 11 reads out question items for determining whether or not they are those with lower levels of security awareness from the questionnaire answer data 1, and whether or not they have become an IT crime victim from the IT crime experience data 2. Then, the psychological information collecting unit 11 sorts, on the basis of what is read out, each user into the low-awareness group if he/she has become an IT crime victim or into the high-awareness group if he/she has not become an IT crime victim, for example. Data of the questionnaire answer data 1 and the IT crime experience data 2, in which each user has been sorted into the low-awareness group or the high-awareness group, are stored in a psychological state data table 12.

FIG. 4 is a diagram illustrating an example of the psychological state data table 12. As illustrated in FIG. 4, the psychological state data table 12 describes, for each user ID, answers to question items regarding the psychological state, etc., and the awareness group, which indicates whether the user belongs to the low-awareness group or the high-awareness group.

Next, for the two groups of data divided into the low-awareness group and the high-awareness group, the statistical analysis unit 13 calculates statistical values (the total number, the mean, the standard deviation, etc.) for each question item to check the normality of each data (step S12). Specifically, the statistical analysis unit 13 checks whether or not each of the two groups of data divided into the low-awareness group and the high-awareness group has a distribution close to normal distribution on the basis of the calculated statistical value.

Next, for the two groups of data divided into the low-awareness group and the high-awareness group, the statistical analysis unit 13 calculates statistical values (the total number, the mean, the standard deviation, etc.) for each question item to check the homoscedasticity of each data (step S13). Specifically, the homoscedasticity between the data of the low-awareness group and the data of the high-awareness group (whether or not the variances of the two groups of data are about the same) is checked.

Next, the statistical analysis unit 13 selects a statistical test method for testing whether or not there are differences between the data of the low-awareness group and the data of the high-awareness group on the basis of the checked normality and homoscedasticity (step S14). The statistical test methods to be selected may include, for example, the Welch's t-test and the Mann-Whitney's U test. In step S14, a statistical test method suitable for the checked normality and homoscedasticity is appropriately selected.

Next, using the selected statistical test method, the statistical analysis unit 13 extracts a question item for which there is a difference between the data of the low-awareness group and the data of the high-awareness group, and data for the extracted question item (for example, the statistical value for the low-awareness group) is regarded as a psychological characteristic ($Y\_i$) (step S15). The extracted psychological characteristic ($Y\_i$) is stored in a psychological characteristic data table 14.

FIG. 5 is a diagram illustrating an example of the psychological characteristic data table 14. As illustrated in FIG. 5, the psychological characteristic data table 14 describes, for each of the question items (Q3, Q4, etc.), the statistical values for the low-awareness group (g1), the statistical values for the high-awareness group (g2), the test value (the t value), the judgment criterion value, and the judgment result. Although FIG. 5 illustrates a case where the t-test is selected as the statistical test method, it may be the U test.

The test value (the t value) is a value calculated according to the statistical test method selected in step S14. In the t-test, the t value for each question item is calculated according to Expression (1) below.

$$t\_Q_i = (m_{g1} - m_{g2})/(\sigma_{g1}/\sqrt{n_{g1}}) (i=1,2,\ldots) \quad (1)$$

In Expression (1), the subscript Qi indicates the question item (i=1, 2, . . . ). The subscript g1 indicates that it is data for the low-awareness group. The subscript g2 indicates that it is data for the high-awareness group.

The judgment criterion value is a value representing the smallest absolute value of the t value with which it can be determined that there is a significant difference between the two groups of data. While the present embodiment uses a value (2.04) to uniformly realize the significance level (about 5%), this value can be set arbitrarily.

The judgment represents the judgment result of whether or not the t value satisfies the judgment criterion value. For example, for Q3 and Q4, since the absolute values (2.74, 2.35) of the t values exceed the judgment criterion value (smallest value), the judgment result is described by the symbol 'T'(True) indicating that it has been judged that there is a significant difference between the data of the low-awareness group and the data of the high-awareness group. That is, for Q3 and Q4, the data is regarded as an extracted psychological characteristic (Y_i). For Q5, since the absolute value (1.36) of the t value becomes below the judgment criterion value (smallest value), the judgment result is described by the symbol 'F'(False) indicating that it has been judged that there is no significant difference between the data of the low-awareness group and the data of the high-awareness group. Therefore, for Q5, the data is not extracted as a psychological characteristic (Y_i).

Referring back to FIGS. 1 and 2, the behavioral characteristic extraction unit 20 performs a process of extracting behavioral characteristics that are characteristic of IT crime victims. Specifically, in the behavioral characteristic extraction step (step S20) illustrated in FIG. 2, the behavioral characteristic extraction unit 20 refers to the IT crime experience data 2 and log data 3, which are information regarding users to be samples, to extract behavioral characteristics that are characteristic of IT crime victims.

The log data 3 is data sequentially storing the user's past actions (operation particulars, display particulars, etc.). Specifically, the log data 3 stores each user (user ID) and action items performed by the user together with the date and the time. The action items stored in the log data 3 may include operating the mouse and the keyboard, as well as the amount of time over which various screens (for example, warning screens) have been displayed, emails that have been sent/received, the time at which patches have been applied, etc.

The behavioral characteristic extraction unit 20 includes a behavioral information collecting unit 21 and a statistical analysis unit 23, as components that refers to the IT crime experience data 2 and the log data 3 to extract behavioral characteristics that are characteristic of IT crime victims. The details of the processes of the behavioral information collecting unit 21 and the statistical analysis unit 23 in the behavioral characteristic extraction step will now be described. FIG. 6 is a flow chart illustrating the behavioral characteristic extraction step.

As illustrated in FIG. 6, the behavioral information collecting unit 21 refers to the awareness group of the psychological state data table 12 so as to determine whether each of the users to be samples belongs to the low-awareness group where the security awareness is low or the high-awareness group where the security awareness is high (step S21). Note that whether one belongs to the low-awareness group or the high-awareness group can be determined by referring to the IT crime experience data 2.

Next, for each user, the behavioral information collecting unit 21 refers to the log data 3 to calculate representative values (statistical values such as the total number, the mean, the standard deviation, and the median) within a certain period of time for each action item (step S22). Specifically, for each user ID, the behavioral information collecting unit 21 extracts action items available within a certain period of time to calculate the representative values for the extracted action items. Note that the period from which action items are extracted may be arbitrarily set by an administrator, or the like, via an input device by the unit of months, weeks, etc. In step S21 and step S22, data obtained/calculated for each user is stored in a behavioral log data table 22.

FIG. 7 is a diagram illustrating an example of the behavioral log data table 22. As illustrated in FIG. 7, the behavioral log data table 22 describes, for each user ID, the awareness group and the representative values (the measurement count, the mean, the standard deviation, etc.) for action items (the warning screen display time, the number of emails sent per day, the patch application interval, etc.).

Next, for the two groups of data divided into the low-awareness group and the high-awareness group, the statistical analysis unit 23 checks the normality of each data on the basis of the statistical values (the total number, the mean, the standard deviation, etc.) for each action item of the log data 3 (step S23). Specifically, the statistical analysis unit 23 checks whether or not each of the two groups of data divided into the low-awareness group and the high-awareness group has a distribution close to normal distribution on the basis of the statistical values.

Next, for the two groups of data divided into the low-awareness group and the high-awareness group, the statistical analysis unit 23 checks, for each action item of the log data 3, the homoscedasticity of each data on the basis of the statistical values (step S24). Specifically, the homoscedasticity between the data of the low-awareness group and the data of the high-awareness group (whether or not the variances of the two groups of data are about the same) is checked.

Next, the statistical analysis unit 23 selects a statistical test method for testing whether or not there are differences between the data of the low-awareness group and the data of the high-awareness group on the basis of the checked normality and homoscedasticity (step S25). The statistical test methods to be selected may include, for example, the Welch's t-test and the Mann-Whitney's U test. In step S25, a statistical test method suitable for the checked normality and homoscedasticity is appropriately selected.

Next, the statistical analysis unit 23 uses the selected statistical test method to extract an action item of the log data 3 for which there is a difference between the data of the low-awareness group and the data of the high-awareness group, and data of the extracted action item (for example, the statistical value for the low-awareness group) is regarded as a behavioral characteristic (X_k) (step S26). The extracted behavioral characteristic (X_k) is stored in a behavioral characteristic data table 24.

FIG. 8 is a diagram illustrating an example of the behavioral characteristic data table 24. As illustrated in FIG. 8, the behavioral characteristic data table 24 describes the statistical values of the low-awareness group (g1), the statistical values of the high-awareness group (g2), the test value (the t value), the judgment criterion value, and the judgment result, for each of the action items (the warning screen display time, the number of emails sent per day, etc.). Although FIG. 8 illustrates a case where the t-test is selected as the statistical test method, it may be the U test.

The test value (the t value) is a value calculated according to the statistical test method selected in step S25. In the t-test, the t value for each action item is calculated according to Expression (2) below.

$$t\_Bj = (m_{g1} - m_{g2})/(\sigma_{g1}/\sqrt{n_{g1}}) (j=1,2,\ldots) \quad (2)$$

In Expression (2), the subscript Bj indicates the action item (j=1, 2, ... ). The subscript g1 indicates that it is data for the low-awareness group. The subscript g2 indicates that it is data for the high-awareness group.

The judgment criterion value is a value representing the smallest absolute value of the t value with which it can be determined that there is a significant difference between the two groups of data. While the present embodiment uses a value (2.05, 2.03, 2.04) to realize the significance level (about 5%) for each action item, this value can be set arbitrarily.

The judgment represents the judgment result of whether or not the t value satisfies the judgment criterion value. For example, for the warning screen display time (B1) and the patch application interval (B3), the judgment result is described by the symbol 'T'(True) indicating that it has been judged that there is a significant difference between the data of the low-awareness group and the data of the high-awareness group since the absolute value (2.19, 2.30) of the t value exceeds the judgment criterion value (smallest value). That is, for B1 and B3, the data is regarded as an extracted behavioral characteristic (X_k). For the number of emails sent per day (B2), since the absolute value (1.31) of the t value becomes below the judgment criterion value (smallest value), the judgment result is described by the symbol 'F'(False) indicating that it has been judged that there is no significant difference between the data of the low-awareness group and the data of the high-awareness group. Therefore, for B2, the data is not extracted as a behavioral characteristic (X_k).

Referring back to FIGS. 1 and 2, in the calculation step (step S30) illustrated in FIG. 2, the calculation unit 30 performs a process of obtaining the relational expression between each of the psychological characteristic items extracted by the psychological characteristic extraction unit 10 and a plurality of items extracted as behavioral characteristics by the behavioral characteristic extraction unit 20. Since the relational expression indicates the correlativity between a psychological characteristic and a behavioral characteristic for which there is a significant difference between the low-awareness group and the high-awareness group, it is also data that indicates the correlativity between a psychological characteristic and a behavioral characteristic for users with lower levels of security awareness.

The calculation unit 30 includes a statistical analysis unit 31 as a component for obtaining the relational expression described above. Now, the details of the process of the statistical analysis unit 31 in the calculation step will be described. FIG. 9 is a flow chart illustrating the calculation step.

As illustrated in FIG. 9, the statistical analysis unit 31 refers to the psychological characteristic data table 14 and the behavioral characteristic data table 24 to check normality of all data of psychological characteristics Y_i (i=1, 2, ... ) and behavioral characteristics X_k (k=1, 2, ... ) (step S31). Specifically, the statistical analysis unit 31 checks whether or not data of psychological characteristics Y_i and behavioral characteristics X_k all have distributions close to normal distribution.

Next, as a result of the normality check, the statistical analysis unit 31 judges whether or not it satisfies normality, i.e., whether or not it is outside normal distribution (step S32). If the psychological characteristic Y_i and the behavioral characteristic X_k do not satisfy normality (step S32: NO), the statistical analysis unit 31 performs a variable conversion to bring the data closer to normal distribution (step S33). Thus, before the relational expression (correlativity) between the psychological characteristic and the behavioral characteristic is obtained, data condition for the psychological characteristic and the behavioral characteristic is adjusted. If the psychological characteristic Y_i and the behavioral characteristic X_k satisfy normality (step S32: YES), the statistical analysis unit 31 skips step S33 to proceed to step S34.

In step S34, the statistical analysis unit 31 uses a conventional regression analysis method to calculate the relational expression (correlativity) between each psychological characteristic Y_i and the behavioral characteristics X_k (k=1, 2, ... ). Specifically, the relational expression is calculated on the basis of a regression formula such as a multiple regression analysis as depicted in Expression (3) below.

$$Y_i = a_1 X_1 + a_2 X_2 + \ldots + a_k X_k \quad (3)$$

In Expression (3), Y is the psychological characteristic, and the subscript i (i=1, 2, ... ) indicates each item of the psychological characteristic. X is the behavioral characteristic, and the subscript k (k=1, 2, ... ) indicates each item of the behavioral characteristic. In each item of the behavioral characteristic, 'a' is the regression coefficient, which indicates the degree of influence of the behavioral characteristic on the psychological characteristic.

Data representing the calculated relational expression is stored in relational expression data 32. FIG. 10 is a diagram illustrating an example of the relational expression data 32. As illustrated in FIG. 10, the relational expression data 32 stores, for each psychological characteristic Y_i, the regression coefficient, which is the degree of influence of each behavioral characteristic.

Referring back to FIGS. 1 and 2, in the user detection step (step S40) illustrated in FIG. 2, the user detection unit 40 calculates, for each user, the psychological characteristic value (Y_i) from the relational expression for each item of the psychological characteristic and the value of the log data 3. Specifically, the user detection unit 40 regularly calculates the psychological characteristic value for each user by referring to the relational expression data 32 and the behavioral log data table 22. Note that the regular interval at which the psychological characteristic value is calculated may be arbitrarily set by an administrator via an input device, or the like, by the unit of months, weeks, etc. Next, the user detection unit 40 detects users for which the psychological characteristic value (Y_i) exceeds a predetermined value, i.e., users with lower levels of security awareness.

Figures 11, 12:
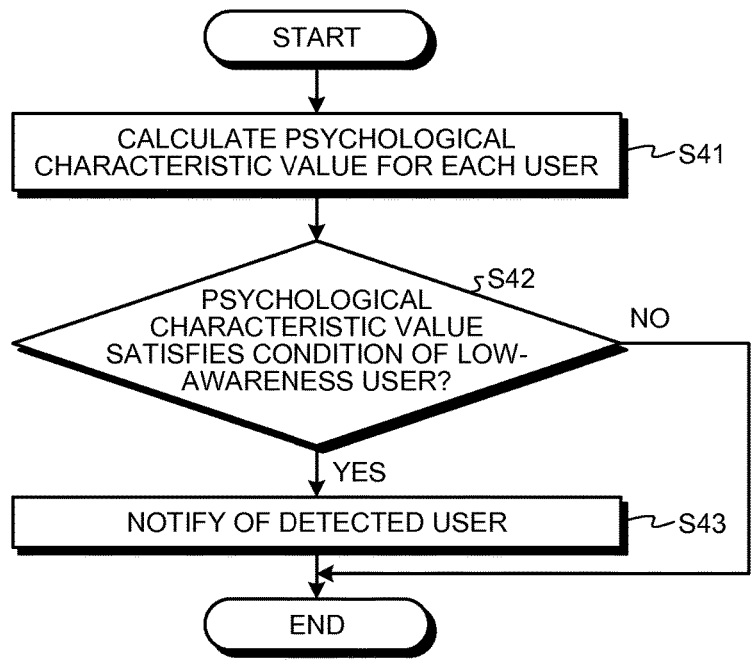
FIG. 11 is a flow chart illustrating a user detection step.
FIG. 12 is a diagram illustrating an example of a user detection table.

The user detection unit 40 includes a detection unit 41 as a component that detects a user. Now, the details of the process of the detection unit 41 in the user detection step will be described. FIG. 11 is a flow chart illustrating the user detection step.

As illustrated in FIG. 11, the detection unit 41 refers to the relational expression data 32 and the behavioral log data table 22 to calculate the psychological characteristic value (Y_i) for each user on the basis of the relational expression and the value of the log corresponding to the behavioral characteristic (X_k) (step S41). Specifically, the psychological characteristic value is obtained by reading out the regression coefficient of the relational expression for Y_i from the relational expression data 32, and multiplying the regression coefficient by the value of the log corresponding to the behavioral characteristic (X_k).

Next, the detection unit 41 judges whether or not the calculated psychological characteristic value satisfies the condition of a low-awareness user with lower levels of security awareness (step S42). The judgment result of the detection unit 41 is stored in a user detection table 42.

FIG. 12 is a diagram illustrating an example of the user detection table 42. As illustrated in FIG. 12, the user detection table 42 stores, for each user ID, the psychological characteristic value of the user and the judgment (judgment result). The judgment stores psychological characteristic items that have been judged to satisfy the condition of a low-awareness user. For example, for the user whose user ID is "u0001," the judgment result for Y_1 (degree of overconfidence) has been judged to satisfy the condition of a low-awareness user.

As a simple configuration, the detection unit 41 makes the judgment on the basis of whether or not the calculated psychological characteristic value exceeds a predetermined threshold. The detection unit 41 judges whether or not the calculated psychological characteristic value is in an upper range within a half, to which the low-awareness group belongs, of the distribution of psychological characteristic values calculated for a plurality of users (for example, the data distribution among all the users). For example, it is judged whether or not the calculated psychological characteristic value belongs to the upper α% on the low-awareness group side, as determined by the statistical test method, of the data distribution for all users. Here, the value a may be arbitrarily set by an administrator via an input device, or the like.

Figure 13:
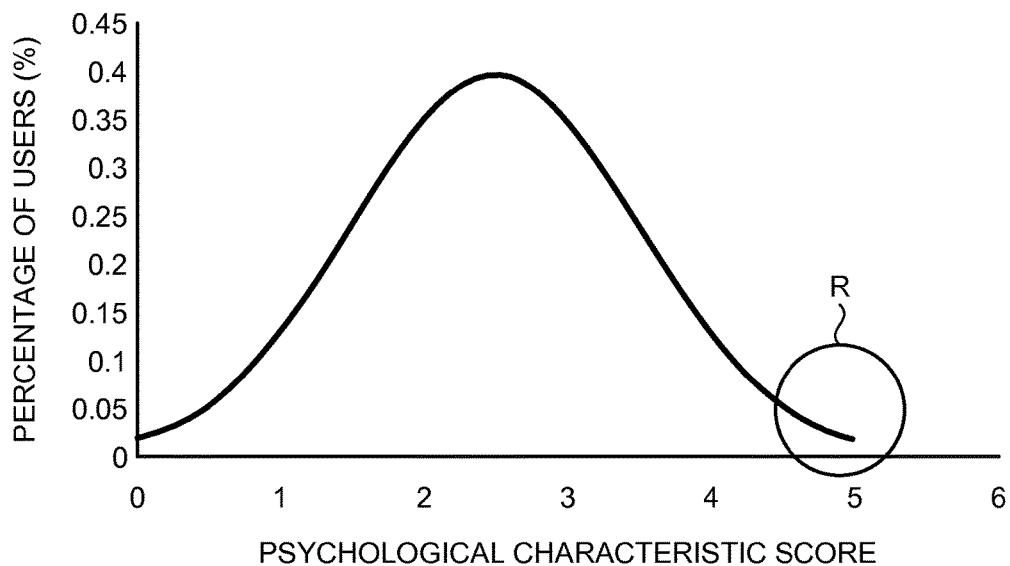
FIG. 13 is a diagram illustrating an example of user detection.

FIG. 13 is a diagram illustrating an example of the user detection. The graph illustrated in FIG. 13 depicts the psychological characteristic score distribution among all users, in terms of the percentage of users. Assume that the side to which the low-awareness group belongs is the side of higher psychological characteristic scores. In this case, the process detects users whose psychological characteristic value (Y_i) score obtained by multiplying the regression coefficient by the value of the log corresponding to the behavioral characteristic (X_k) falls within the region R, which represents the upper α%.

The detection unit 41 refers to the user detection table 42 to judge whether or not the calculated psychological characteristic value satisfies the condition of a low-awareness user (step S42), and if so (step S42: YES), notifies the distribution unit 50 of the detected user (step S43). Specifically, the detection unit 41 notifies of the psychological characteristic which has been judged to satisfy the condition and the value thereof, as well as the user ID representing the detected user.

Referring back to FIGS. 1 and 2, in the distribution step (step S50) illustrated in FIG. 2, the distribution unit 50 distributes, to a user whose psychological characteristic value (Y_i) calculated in step S40 exceeds a predetermined value, i.e., a user with lower levels of security awareness, a measure devised for the exceeded psychological characteristic. Specifically, the distribution unit 50 distributes a measure devised for that psychological characteristic on the basis of the psychological characteristic having been judged to satisfy the condition and the value thereof, which have been notified by the detection unit 41 together with the user ID.

Figure 14:
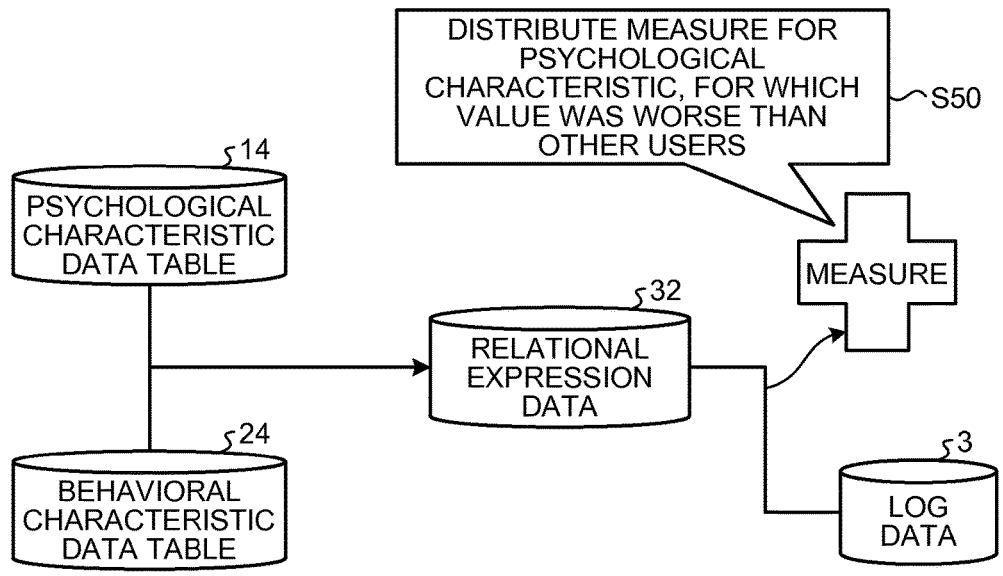
FIG. 14 is a diagram illustrating an example of measure distribution.

FIG. 14 is a diagram illustrating an example of the measure distribution. As illustrated in FIG. 14, if the psychological characteristic value obtained from the relational expression data 32 and the log data 3 exceeds a predetermined value, the management device 100 distributes, to a user, a measure devised for the exceeded psychological characteristic value, i.e., a measure that is prepared while taking into consideration the user's psychological traits. Specifically, a measure for a psychological characteristic, for which the user had a worse value than other users, is distributed. For example, if it is judged that the judgment result for the degree of overconfidence, as a psychological characteristic, satisfies the condition, a measure devised for the degree of overconfidence is distributed. Thus, since a measure devised for a user's own psychological characteristic is distributed to the user, it is possible to effectively improve the user's security awareness. Thus, it is possible to improve the security of the system.

All or any part of various process functions performed by the management device 100 may be executed on a CPU (or a microcomputer such as an MPU or an MCU (Micro Controller Unit)). Moreover, it is understood that all or any collection of the various process functions may be executed on a program to be analyzed/executed by a CPU (or a microcomputer such as an MPU or an MCU) or may be executed on wired-logic hardware.

Figure 15:
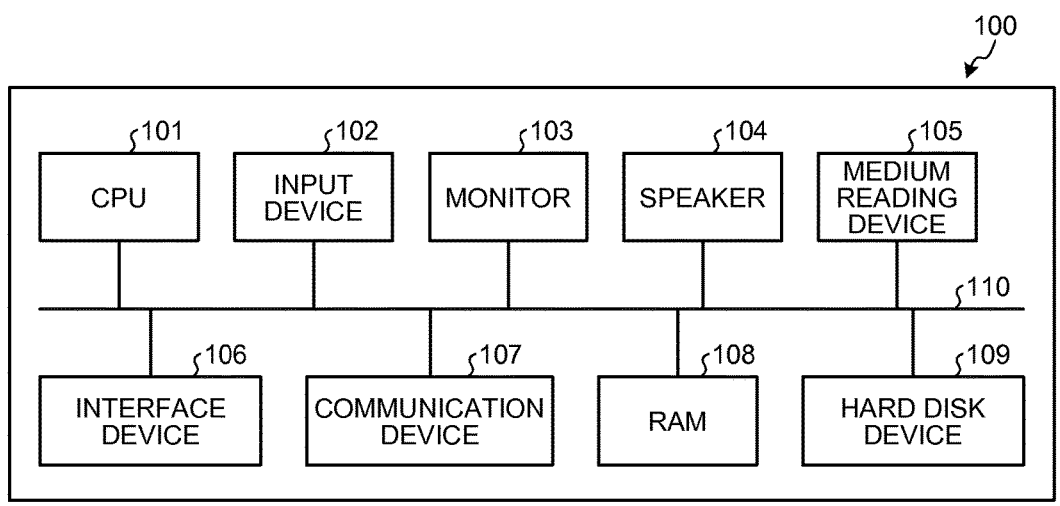
FIG. 15 is a block diagram illustrating a hardware configuration of a management device.

Now, various processes described in the embodiment above can be implemented by executing programs, which are provided in advance, on a computer. Therefore, an example of a computer (hardware) executing programs having similar functions to the embodiment described above will be described. FIG. 15 is a block diagram illustrating a hardware configuration of the management device 100.

As illustrated in FIG. 15, the management device 100 includes a CPU 101 that executes various calculation processes, an input device 102 that accepts data inputs, a monitor 103, and a speaker 104. The management device 100 also includes a medium reading device 105 that reads out programs, etc., from a storage medium, an interface device 106 for connecting with various devices, and a communication device 107 for making a wired or wireless communication connection with external devices. The management device 100 includes a RAM 108 for temporarily storing various information, and a hard disk device 109. The various units (101 to 109) in the management device 100 are connected to a bus 110.

The hard disk device 109 stores therein programs (management programs) having similar functions to various processing units, i.e., the psychological characteristic extraction unit 10, the behavioral characteristic extraction unit 20, the calculation unit 30, the user detection unit 40, and the distribution unit 50. The hard disk device 109 also stores therein various data for implementing the programs. The input device 102 accepts inputs of operation information from an operator of the management device 100, for example. The monitor 103 displays various screens to be operated by the operator, for example. A printer device, or the like, for example, is connected to the interface device 106. The communication device 107 is connected to a communication network such as a LAN (Local Area Network), and exchanges various information with external devices via the communication network.

The CPU 101 reads out various programs stored in the hard disk device 109, and expands and executes the programs on the RAM 108, thereby executing various processes. These programs can cause the management device 100 to function as the psychological characteristic extraction unit 10, the behavioral characteristic extraction unit 20, the calculation unit 30, the user detection unit 40, and the distribution unit 50.

Note that the programs described above do not need to be stored in the hard disk device 109. For example, the management device 100 may read out and execute programs stored in a storage medium that can be read by the management device 100. Storage media that can be read by the management device 100 may include, for example, portable recording media such as CD-ROMs, DVD discs and USB (Universal Serial Bus) memories, semiconductor memories such as flash memories, hard disk drives, etc. The program may be stored in a device connected to a public network, the Internet, a LAN (Local Area Network), or the like, and the management device 100 may read out and execute the program therefrom.

Figure 16:
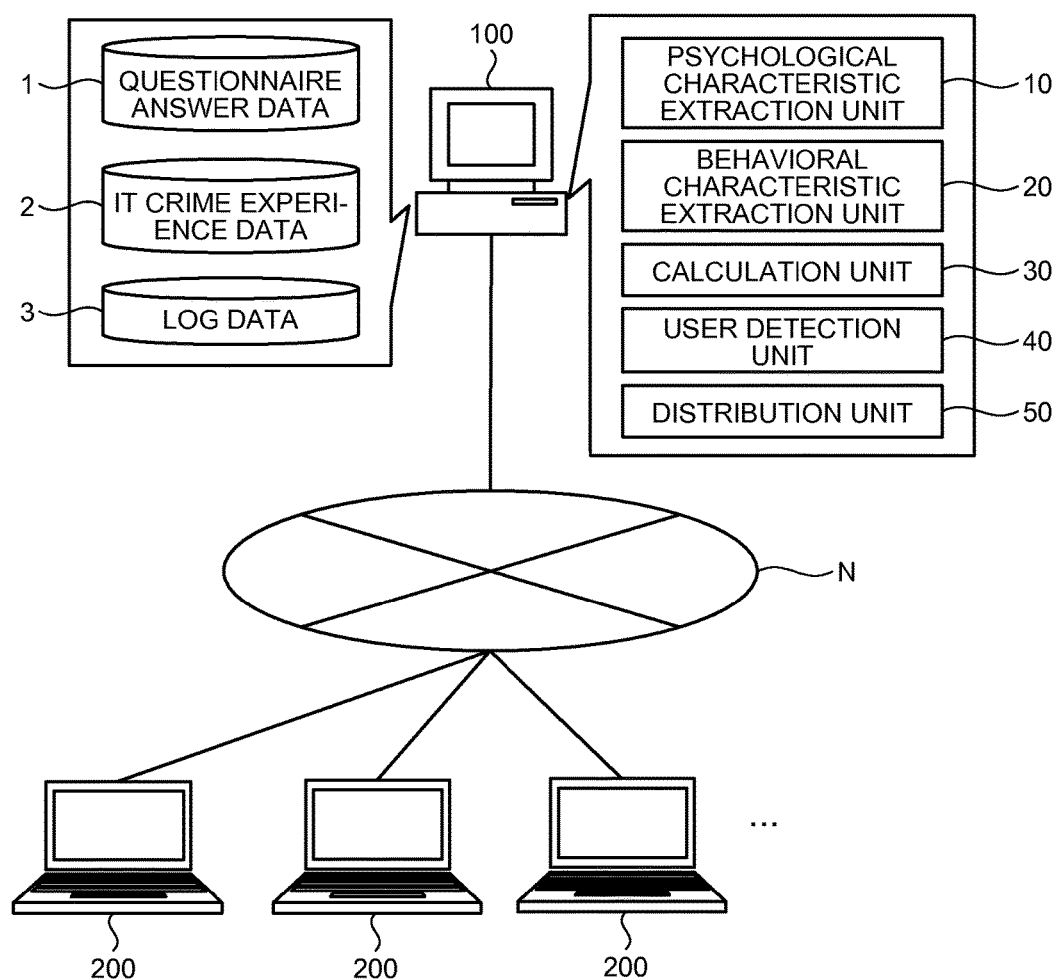
FIG. 16 is a diagram illustrating an example of a system using a management device.
Figure 17:
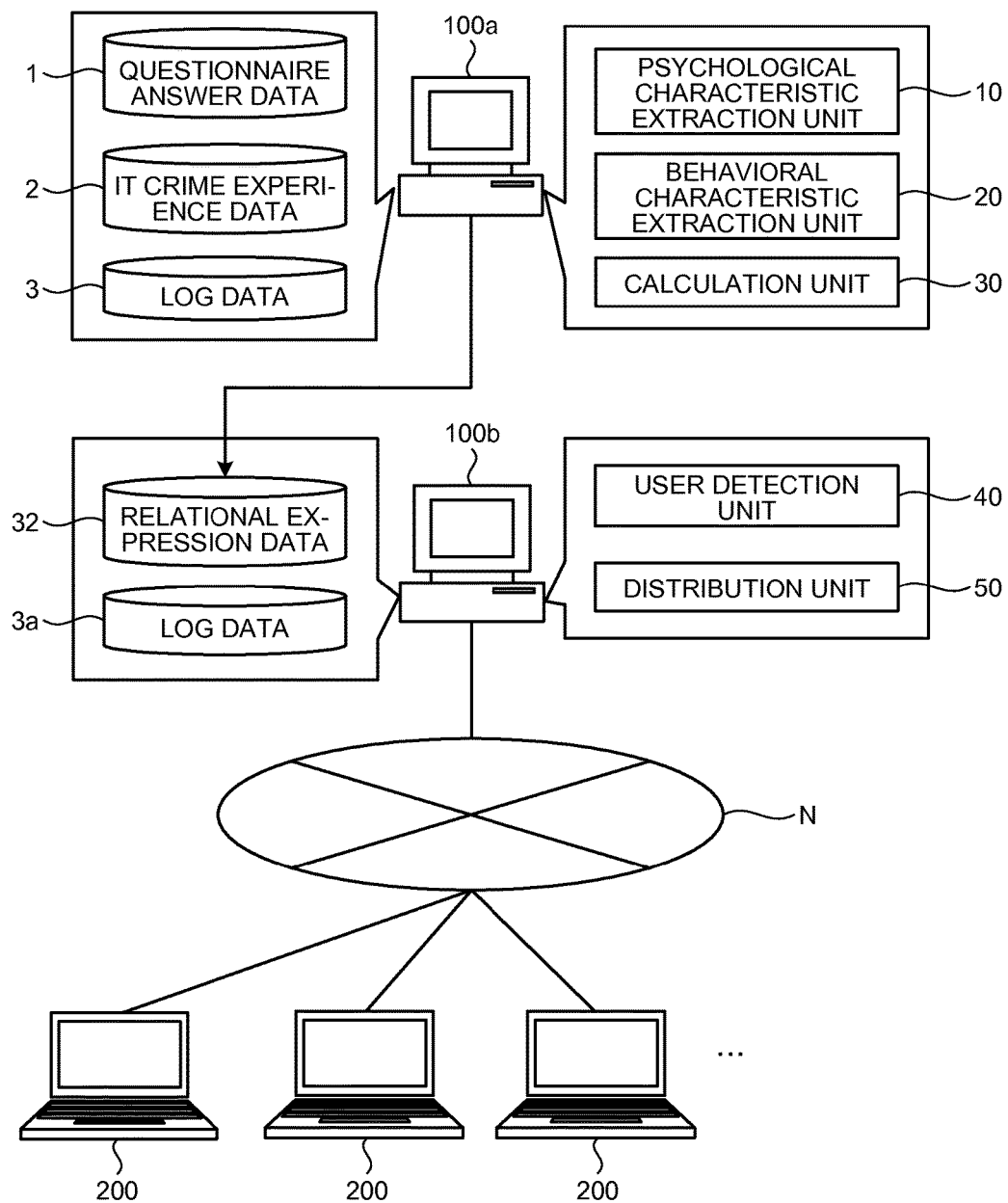
FIG. 17 is a diagram illustrating an example of a system using a management device.

FIG. 16 and FIG. 17 are diagrams each illustrating an example of a system using a management device. As illustrated in FIG. 16, the management device 100 may be a server device that manages users of a plurality of terminal devices 200 connected to a communication network N. The management device 100 may accumulate, on a daily basis, user operations made via the terminal device 200 as the log data 3, and may distribute a measure to a user who has been detected as having lower levels of security awareness, or to others related to that user (for example, the user's seniors and people in the human resources department).

As illustrated in FIG. 17, the system may separately include a management device 100a to be used in the preparatory phase up until the relational expression data 32 is calculated, and a management device 100b to be used in the operation phase in which the calculated relational expression data 32 is utilized. The management device 100a executes programs to implement the functions as the psychological characteristic extraction unit 10, the behavioral characteristic extraction unit 20, and the calculation unit 30, thereby performing operations up to the calculation of the relational expression data 32. The management device 100b executes programs to implement the functions as the user detection unit 40 and the distribution unit 50, thereby performing operation of the system based on the calculated relational expression data 32 and log data 3a. Specifically, the management device 100b accumulates, on a daily basis, user operations made via the terminal device 200 as the log data 3a, and distributes a measure to a user who has been detected as having lower levels of security awareness, or to others related to that user (for example, the user's seniors and people in the human resources department).

According to one embodiment, there is an advantage that it is possible to improve security.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A management method comprising: extracting, using a hardware processor, psychological characteristics of first people from psychological characteristics that are included in questionnaire answer data read from a storage device and derived from the first people and second people, the psychological characteristics including a degree of over confidence wherein the first people each have performed one or more of operations in an information processing system, the one or more operations including opening a malicious email attachment, wherein the second people each have not performed the one or more of operations, and the extracted psychological characteristics are each rated at values and are determined to be characteristic of the first people more than the second people by a difference that exceeds a first specific value;

extracting, using the hardware processor, behavioral characteristics of the first people from log data of operations performed with respect to the information processing system by the first people and the second people within a predetermined period, the log data including a time of patch application and being collected from the information processing system, stored in the storage device, and read therefrom, the extracted behavioral characteristics each including values and being determined to be characteristic of the first people more than the second people by a difference that exceeds a second specific value;

obtaining, using the hardware processor, by employing a regression analysis method, regression formulas that each describe a relationship between the value of each of the extracted psychological characteristics and the values of the extracted behavioral characteristics;

calculating at regular intervals, using the hardware processor, a value of each of the extracted psychological characteristics from the regression formulas and the log data that is read from the storage device at the regular intervals, for each user; and improving security by delivering, using the hardware processor, to any user when the calculated value of any of the extracted psychological characteristics thereof exceeds a predetermined value, a corrective measure specifically devised for a psychological characteristic whose calculated value exceeds the predetermined value.

2. The management method according to claim 1, wherein the delivering a corrective measure includes delivering a corrective measure specifically devised for a psychological characteristic to a user when a calculated value of the psychological characteristic thereof falls within a region of a distribution of calculated values of the psychological characteristic of a plurality of users, the region being where a calculated value of the psychological characteristic of the first people is positioned and occupying a predetermined ration of the distribution.

3. A management device comprising a memory and a hardware processor coupled to the memory, the hardware processor executing a process including: calculating at regular intervals, for each user, a value of each of psychological characteristics including a degree of over confidence from regression formulas and log data that includes a time of patch application, is collected from an information processing system, is stored in a storage device, and is read therefrom at the regular intervals, the regression formulas being obtained by employing a regression analysis method and each regression formula describing a relationship between a value of each of the psychological characteristics that are characteristic of people who each have performed one or more of operations in the information processing system, the one or more operations including opening a malicious email attachment, and values of behavioral characteristics that are characteristic of the people, so as to detect a user of which the calculated value of any of the psychological characteristics exceeds a predetermined value; and improving security by delivering, to the detected user, a corrective measure specifically devised for a psychological characteristic whose calculated value exceeds the predetermined value.

4. A non-transitory computer-readable recording medium having stored therein a management program that causes a computer to execute a process comprising:

calculating at regular intervals, for each user, a value of each of psychological characteristics including a degree of over confidence from regression formulas and log data that includes a time of patch application, is collected from an information processing system, is stored in a storage device, and is read therefrom at the regular intervals, the regression formulas being obtained by employing a regression analysis method and each regression formula describing a relationship between a value of each of the psychological characteristics that are characteristic of people who each have performed one or more of operations in the information processing system, the one or more operations including opening a malicious email attachment, and values of behavioral characteristics that are characteristic of the people, so as to detect a user of which the calculated value of any of the psychological characteristics exceeds a predetermined value; and improving security by delivering, to the detected user, a corrective measure devised for a psychological characteristic whose calculated value exceeds the predetermined value.

\* \* \* \* \*